US012118361B2

(12) United States Patent
Saidi (10) Patent No.: US 12,118,361 B2
(45) Date of Patent: Oct. 15, 2024

(54) UNICONTAINERS (71) Applicant: SRI International, Menlo Park, CA (US)

(72) Inventor: Hassen Saidi, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 851 days.

(21) Appl. No.: 16/689,762

(22) Filed: Nov. 20, 2019

(65) Prior Publication Data

US 2020/0159536 A1 May 21, 2020

Related U.S. Application Data (60) Provisional application No. 62/770,643, filed on Nov. 21, 2018.

(51) Int. Cl.
*G06F 9/30* (2018.01)
*G06F 8/61* (2018.01)
*G06F 8/71* (2018.01)
*G06F 9/38* (2018.01)
*G06F 9/455* (2018.01)

(52) U.S. Cl.
CPC ............. *G06F 9/3838* (2013.01); *G06F 8/63* (2013.01); *G06F 8/71* (2013.01); *G06F 9/3012* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| 10,892,960 | B1* | 1/2021 | Emelyanov | H04L 67/34 |
| 2016/0371176 | A1* | 12/2016 | Adar | G06F 9/45504 |
| 2018/0025160 | A1* | 1/2018 | Hwang | G06F 9/455 726/25 |
| 2019/0108048 | A1* | 4/2019 | Chen | G06F 9/455 |
| 2020/0150940 | A1* | 5/2020 | Li | G06F 8/443 |
| 2020/0272440 | A1* | 8/2020 | Burgazzoli | G06F 8/70 |

OTHER PUBLICATIONS

"What are unikernels?," Unikernel, Retrieved from: https://web.archive.org/web/20181110033228/http://unikernel.org/, Nov. 10, 2018, 3 pp.
"SRI-CSL/whole-program-llvm," Github, Retrieved from: https://web.archive.org/web/20180611000530/https://github.com/SRI-CSL/whole-program-llvm, Jun. 11, 2018, 5 pp.

(Continued)

*Primary Examiner* — Fahmida Rahman
(74) *Attorney, Agent, or Firm* — Shumaker & Sieffert, P.A.

(57) ABSTRACT

In general, this disclosure describes techniques for building an application designed to run on a given infrastructure as a container. For example, a unicontainer as described herein may represent a smallest-size, statically-linked binary that is the most optimal implementation of a container for executing an application. In some examples, a computing system builds this container by identifying unused or unneeded functionalities from dependencies for the application, for instance where such functionalities are provided by a target infrastructure for the container.

20 Claims, 4 Drawing Sheets (56) References Cited

OTHER PUBLICATIONS

"SRI-CSL/OCCAM," Github, Retrieved from: https://web.archive.org/web/20180611151947/https://github.com/SRI-CSL/OCCAM, Jun. 11, 2018, 4 pp.

"SRI-CSL/Wholly," Github, Retrieved from: https://web.archive.org/web/20180613040011/https://github.com/SRI-CSL/Wholly, Jun. 13, 2018, 3 pp.

Gelle et al., "Wholly!: A Build System for The Modern Software Stack," FMICS 2018: Formal Methods for Industrial Critical Systems, Aug. 30, 2018, 15 pp.

* cited by examiner

UNICONTAINERS

CROSS REFERENCE

This application claims the benefit of U.S. Provisional Patent Application No. 62/770,643, filed on Nov. 21, 2018, the entire content of which is hereby incorporated by reference.

TECHNICAL FIELD

This disclosure is related to computing systems, and more specifically to building container virtualization elements.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

Consequently, container technology allows for the creation of agile and flexible applications. These applications have many advantages including the ability to be deployed on distributed and cloud platforms. Higher performance and improved isolation may be realized through further improvements.

SUMMARY

In general, this disclosure describes techniques for building an application designed to run on a given infrastructure as a container. For example, a unicontainer as described herein may represent a smallest-size, statically-linked binary that is the most optimal implementation of a container for executing an application. In some examples, a computing system builds this container by identifying unused or unneeded functionalities from dependencies for the application, for instance where such functionalities are provided by a target infrastructure for the container. The computing system may analyze a dependency hierarchy for the application, determine the minimum functions necessary for each dependency to run dependencies higher up the hierarchy, remove unnecessary functions from the dependencies and build a language-independent intermediate representation which may be further optimized using static prevertualization and performing partial evaluation. The optimization need not be done at the time of final application compilation. Rather, dependencies can be optimized independent of the final compilation forming a language-independent intermediate representation which can then be incorporated into the final application build at a later time.

In some examples, the system may further optimize the language-independent intermediate representation, as described herein, using partial evaluation techniques. For instance, the system may parse the code to evaluate each function, and if the system finds a function that is determinable before execution, i.e., it does not depend on an unknown or a value determinable only at the time of execution, the system evaluates the function.

In some examples, the computing system optimizes the container in view of a target virtualization infrastructure on which the container is to be deployed. A target virtualization infrastructure, e.g., servers each executing a container platform (such as Docker), includes infrastructure in the form of the hardware environment and, in some cases for instance, an operating system, applications, libraries, binaries, packages, and other code to support containers deployed to the server. This target virtualization infrastructure is the lowest level in the dependency hierarchy for a container. The computing system may therefore dynamically adjust the dependencies at various levels in the hierarchy to build a container that fully utilizes the target virtualization infrastructure while still having a smallest, minimal execution element deployable and executable by the target virtualization infrastructure. In some examples, the computing system permits a user to specify, for a container, any of the infrastructure code provided by the target virtualization infrastructure to utilize by dynamically-linking to the container. The computing system may build all other infrastructure code into the container by statically-linking in the already-optimized dependencies.

The techniques may provide one or more technical advantages. For example, the system may produce for each application running in a unicontainer, the smallest image possible that can run the application as a single statically linked executable with no dependencies. As another example, since unicontainers are built as layers of dependencies, the system may build each layer as the smallest layer of code that is necessary to run the layer above it. The layers can then be combined using optimization techniques described herein to produce the final executable application. As another example, the orchestration infrastructure necessary to run a virtual machine can be incorporated into the container image so that the container with the applications can be run on an arbitrary cloud infrastructure. Because unicontainers are built as layers, the orchestration logic can be added at the time of deployment providing additional flexibility. As another example, the application can be broken into smaller chunks and deployed as microservices. As another example, by reducing the dependencies to only those functions necessary to run the application, the system reduces the potential security vulnerabilities of the application.

In some examples, a computing system for generating container images comprises a computation engine comprising at least one processor and configured to execute a build module, wherein the build module is configured to receive a recipe file for an application build of an application to be deployed as a container image, wherein the recipe specifies one or more dependencies of the application, wherein the build module is configured to obtain, based at least on required functions of a first dependency of the one or more dependencies to support the application, a first version of the first dependency that is configured to provide the required function but that is not configured to provide at least one other function provided by a second version of the first dependency, and wherein the build module is configured to build a container image comprising the application, wherein to build the container image the build module is configured to statically link the first version of the first dependency into the application to optimize the application build of the application.

In some examples, a method for generating container images comprises receiving, with a computing system, a recipe file for an application build of an application to be deployed as a container image, wherein the recipe specifies one or more dependencies of the application; obtaining, with the computing system, based at least on required functions of a first dependency of the one or more dependencies to support the application, a first version of the first dependency that is configured to provide the required function but that is not configured to provide at least one other function provided by a second version of the first dependency, and building, with a computing system, a container image comprising the application, wherein to build the container image the build module is configured to statically link the first version of the first dependency into the application to optimize the application build of the application.

In some examples, a computer-readable storage medium comprises instructions for causing a computing system to perform operations comprising: receiving a recipe file for an application build of an application to be deployed as a container image, wherein the recipe specifies one or more dependencies of the application; obtaining, based at least on required functions of a first dependency of the one or more dependencies to support the application, a first version of the first dependency that is configured to provide the required function but that is not configured to provide at least one other function provided by a second version of the first dependency, and building a container image comprising the application, wherein to build the container image the build module is configured to statically link the first version of the first dependency into the application to optimize the application build of the application.

The details of one or more examples of the techniques of this disclosure are set forth in the accompanying drawings and the description below. Other features, objects, and advantages of the technique will be apparent from the description and drawings, and from the claims.

BRIEF DESCRIPTION OF DRAWINGS

Like reference characters refer to like elements throughout the figures and description.

DETAILED DESCRIPTION

Virtualization has allowed applications to be packaged and run on a multitude of distributed platforms. Scalability, quality of service, resiliency, and security are often guaranteed through replication and strong guarantees of isolation. For example, containers provide operating-system-level virtualization that allows for the development and delivery of software inside standardized software packages. These packages can be linked together either on a single system or on distributed systems to create bigger and more complex programs. At their core, containers are a unit of software delivery designed to be isolated from the rest of the system.

The deploy-ability and security of container systems can come at a cost both in terms of performance as well as size since each instance of the container must bring its own version of libraries and services that might otherwise be shared between systems. This can result in multiple instances of the same library or service being deployed. This problem is further exacerbated by the target program in a container system needing a fraction of the library and services that are offered. Unikernals have attempted to address some of these challenges, but the systems are not amenable to distributed computing and are impossible to debug once in production.

There are two major goals when developing virtualization systems for enterprise and government applications. First, there is a desire to be able to build, test, and deploy software cheaply, rapidly, frequently, and more reliably. Second, there is a desire to reduce the security risk due to the presence of exploitable software vulnerabilities of dependencies, which can be exacerbated by the availability of a large amount of open-source code, and the ease by which software can be built and deployed.

As described herein, unicontainers may facilitate these goals by providing a systematic way of building software applications that can be deployed on any infrastructure with optimized dependencies and creating an intermediate representation that is composable, amenable to analysis, specialization, and security improvements.

Figure 1A:
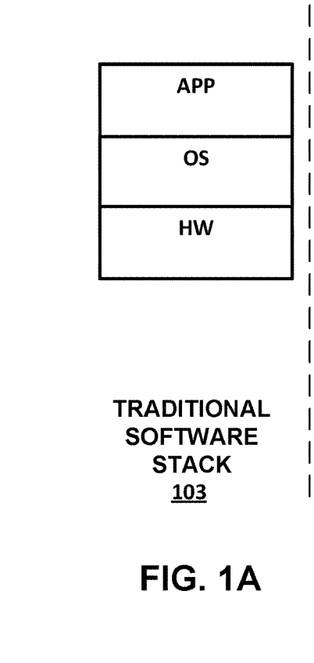
FIGS. 1A-1C are block diagrams comparing traditional software stacks and a unicontainer stack, in accordance with techniques of the disclosure.
Figure 1B:
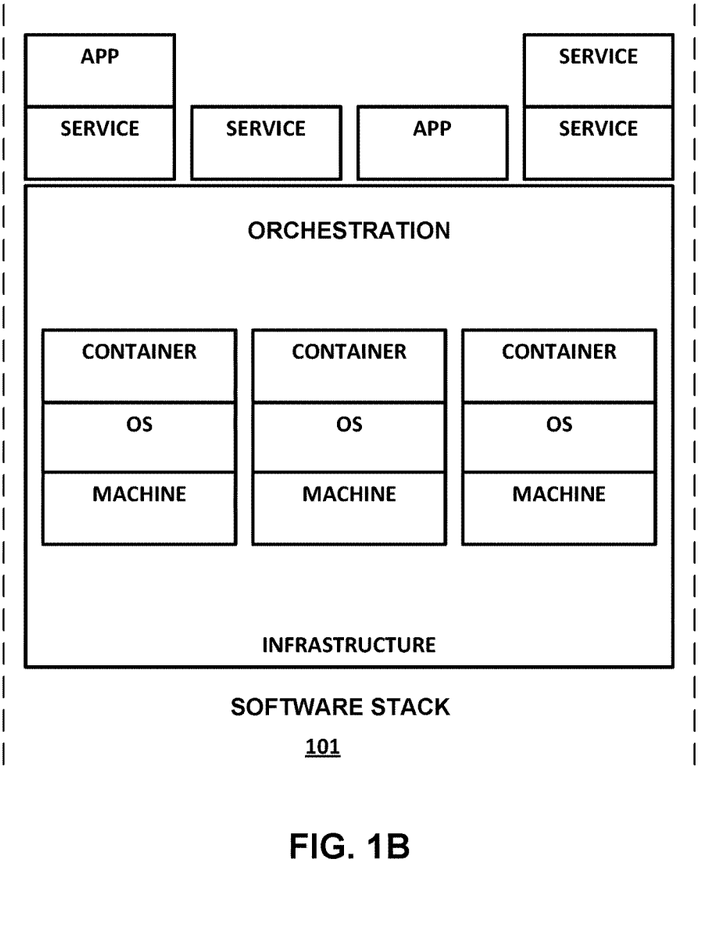
Figure 1C:
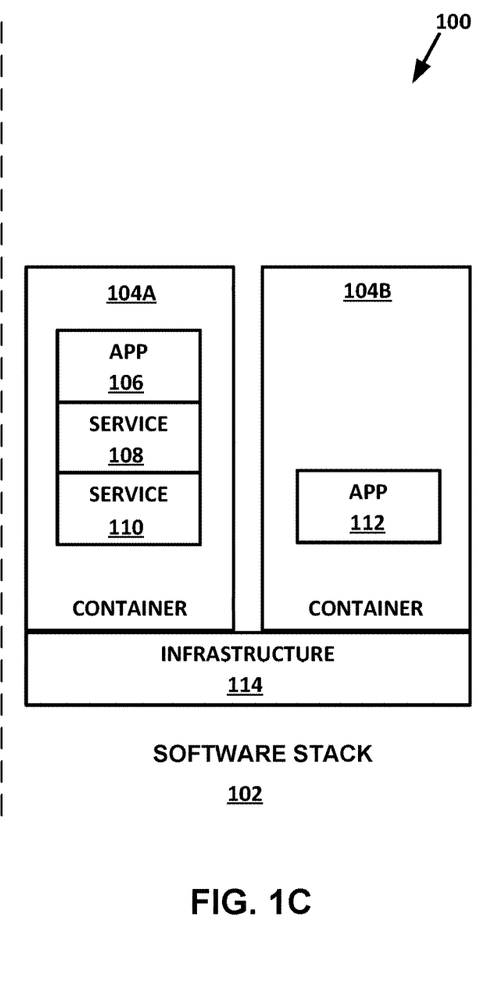

FIGS. 1A-1C are block diagrams comparing a traditional software stack 103, a traditional container stack 101, and a unicontainer stack 102, in accordance with techniques of the disclosure. The traditional software stack 103 consists of an operating system that manages the computer hardware, software resources, and provides common services for the application layer. The operating system layer may further contain many of the shared libraries and services that applications in the application layer depend on to run. The application layer may consist of software designed to perform a group of coordinated functions, tasks, or activities for the benefit of the user. The software may include web browsers, word processors, spreadsheets, email clients, media players, and file viewers among other things. Additional shared libraries and services may exist in the application layer that allows for application interoperability.

The traditional container stack 101 relies on a very similar architecture as the traditional software stack 103. However, instead of a single operating system layer that interfaces with the application layer and the hardware and one application layer that interfaces with the operating system, the server may execute several containers that employ operating system-level virtualization. As in the illustrated example, in some cases, the containers can run on different virtual machines each having a different guest operating system. The containers interact with the system through an orchestration layer, which packages and deploys applications as containers and manages deployed containers. The orchestration layer may, however, depend on various libraries and services that are outside of the orchestration layer, such as the guest OSes of the virtual machines that may themselves have various libraries, binaries, or other code to support the containers. The orchestration layer may also manage system calls as well as function calls between the containers and the interface. For the traditional container stack 101, the orchestration layer is a fixed platform.

In contrast to the traditional stacks mentioned above, the unicontainer stack 102 may directly interact with infrastructure 114 instead of through an operating system and/or an orchestration layer. Infrastructure 114 may be any part of a computing system such as an operating system, a container engine, or even a bare metal server. A computing system described herein may build a unicontainer (e.g., container 104A or container 104B) according to a selected target infrastructure. For example, a computing system may build a first unicontainer to execute on a target infrastructure that includes a Docker engine, a second unicontainer to execute on a target infrastructure that includes an operating system having a first set of libraries, a third unicontainer to execute on a target infrastructure that includes a virtual machine having a second set of libraries, and a fourth unicontainer to execute directly on bare metal. Container 104A includes application 106 and services 108, 110; container 104B includes application 112.

The infrastructure that the unicontainer is deployed to may therefore be independent of the target application that is being run. That is, a computing system may tailor a unicontainer to run the same application on several different infrastructure types. For example, in some examples, a microservice may be implemented in a unicontainer that is running in a virtual machine, and the same microservice may be implemented in a unicontainer that is running directly on bare metal.

Figure 2:
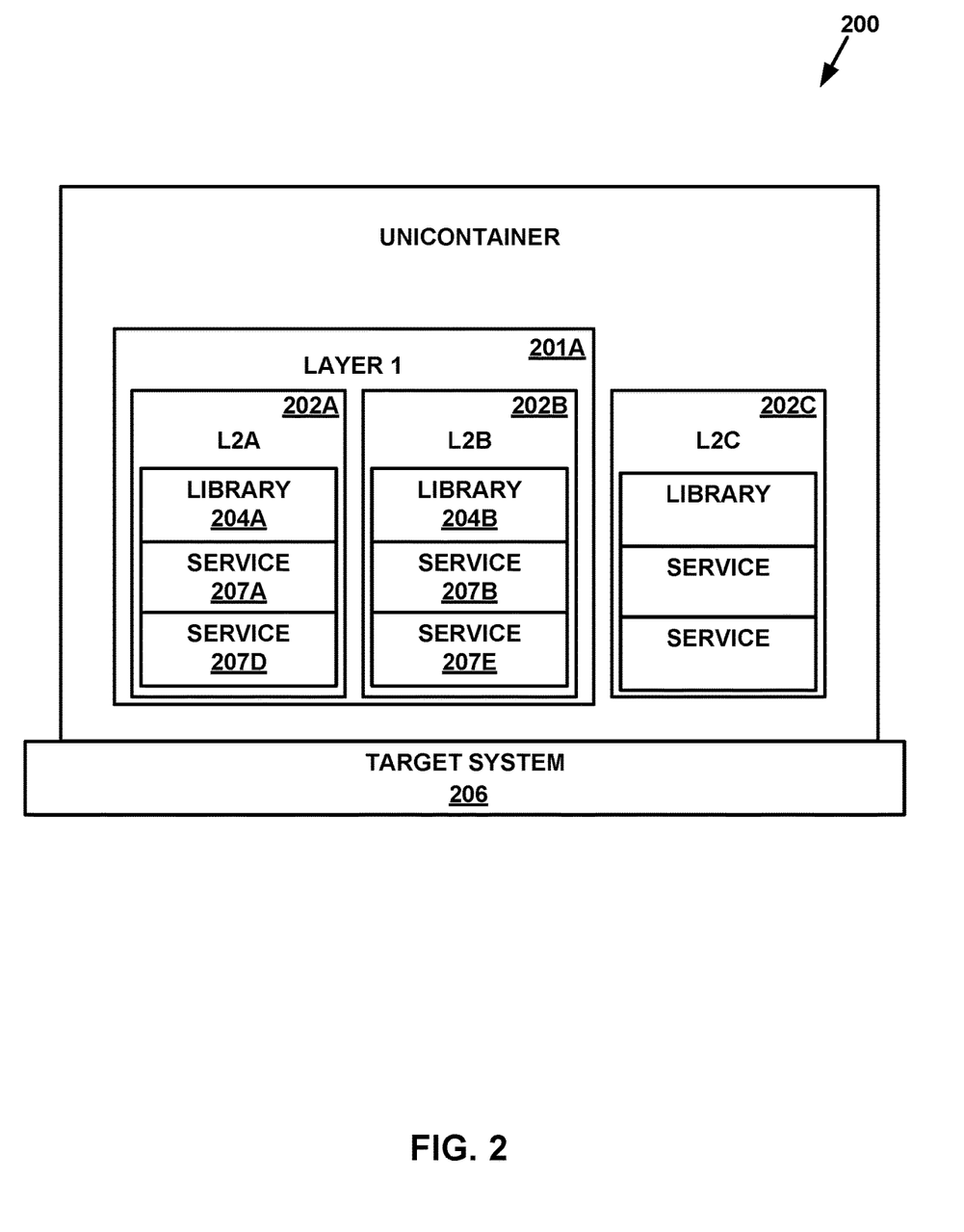
FIG. 2 is a block diagram illustrating a unicontainer, according to techniques of this disclosure.

FIG. 2 is a block diagram illustrating a unicontainer, according to techniques of this disclosure. A computing system may analyze a recipe that defines an image to be built for deployment in a container and use the recipe to build unicontainer 200 by statically-linking multiple optimized layers of dependencies. Because unicontainers are built using layers of dependencies (e.g., layers 201A, 202A, 202B, 202C in the example of FIG. 2), the computing system may build each layer as the smallest layer of code that is necessary to run the layer that depends on that layer. For example, layer 201A may represent an application, module, library, service, or other executable code that has layers 202A and 202B as dependencies. Each of layers 202A and 202B may represent an application, module, library, service, or other executable code that has its own dependencies. Specifically, layer 202A depends on library 204A, service 207A, and service 207D, while layer 202B depends on library 204B, service 207B, and service 207E. Each of libraries 204A-204B and services 207A-207B and 207D-207E may itself be an optimized code selected for inclusion in the corresponding layer due to its minimum code base needed to support the corresponding layer.

Layers 201A and 202A-202C are then combined using optimization techniques described herein to produce the unicontainer 200. Thus, each layer can include a collection of libraries 204 and/or services 207 necessary to run the applications in that layer. In some examples, the libraries 204 and/or services 207 are additional dependencies that include their own libraries and/or services. In some examples, any one or more of "layers" 201A, and 202A-202C may be a different unicontainer. For example, layer 201A may be a unicontainer built to include layers 202A and 202B that are also unicontainers, built according to techniques of this disclosure. As another example, layer 201A and layer 202A may be a unicontainer, while layer 202B is a library.

Dependencies may be optimized by building an instance of the dependency that does not include any code required to support functionality not needed by the supported layer to execute as part of a containerized application. Libraries are typically general-purpose, containing more functionality than is necessary for a calling program needs to operate. For example, the GNU C Library (glibc) is a common library with broad functionality, including functions such as open, read, write, malloc, printf, getaddrinfo, dlopen, pthread_create, crypt, login, and exit. This broad range of functionalities are particularly useful when creating a general-purpose library that may be dynamically linked to support various programs. However, this type of general-purpose library also contributes to code bloat by including code not needed for the target application to execute. To create a lean application, a computing system builds unicontainers by using libraries from which the code that is not necessary for the target application to execute has been removed.

Because each layer is contained, the code of the libraries and services in that layer can be reduced to only those functions that are necessary for the higher layer to function. As used herein, a function is a section of a program, library, service, or other code that performs a specific task. The function may be invokable by other code. Since all functions necessary for an application to operate as expected can be known at the time of building, the general-purpose dependency may be converted into a highly specialized dependency tailored for the target application. For example, if a target application relies on glibc to run but only requires the open, read and write functionalities, the final unicontainer will include only the portions of glibc that are necessary to execute the open, read and write functionalities.

Similar to libraries, services are typically general-purpose, providing more functionality than is necessary for the target application to run. However, because services are external to the target application, they may be optimized separately. If the computing system determines that there are no data dependencies between different specializations of a given portion of the code, the computing system can create separate containers for each of the services. Services may include microservices or other applications.

For example, layer 202A may require three particular functions of library 204A (e.g., open, read, and write of glibc), a library that includes ten functions. The computing system may determine, from the recipe for unicontainers 200, the three functions of library 204A needed and map this determination to a particular build of library 204A stored to a registry, where that particular build of library 204A includes only the three functions needed. The computing system may then statically link that particular build of library 204A, which is optimal for layer 202A, to layer 202A. As noted above, the computing system may combine layer 202A with layer 201A and 202B-202C to produce unicontainer 200. As a result, unicontainer 200 is a reduced container image that has a reduced size versus a conventional container built by statically linking dependencies. In some cases, unicontainer 200 may be the smallest image possible that can run the application as a single statically-linked executable with no dependencies that are external to unicontainer 200.

Figure 3:
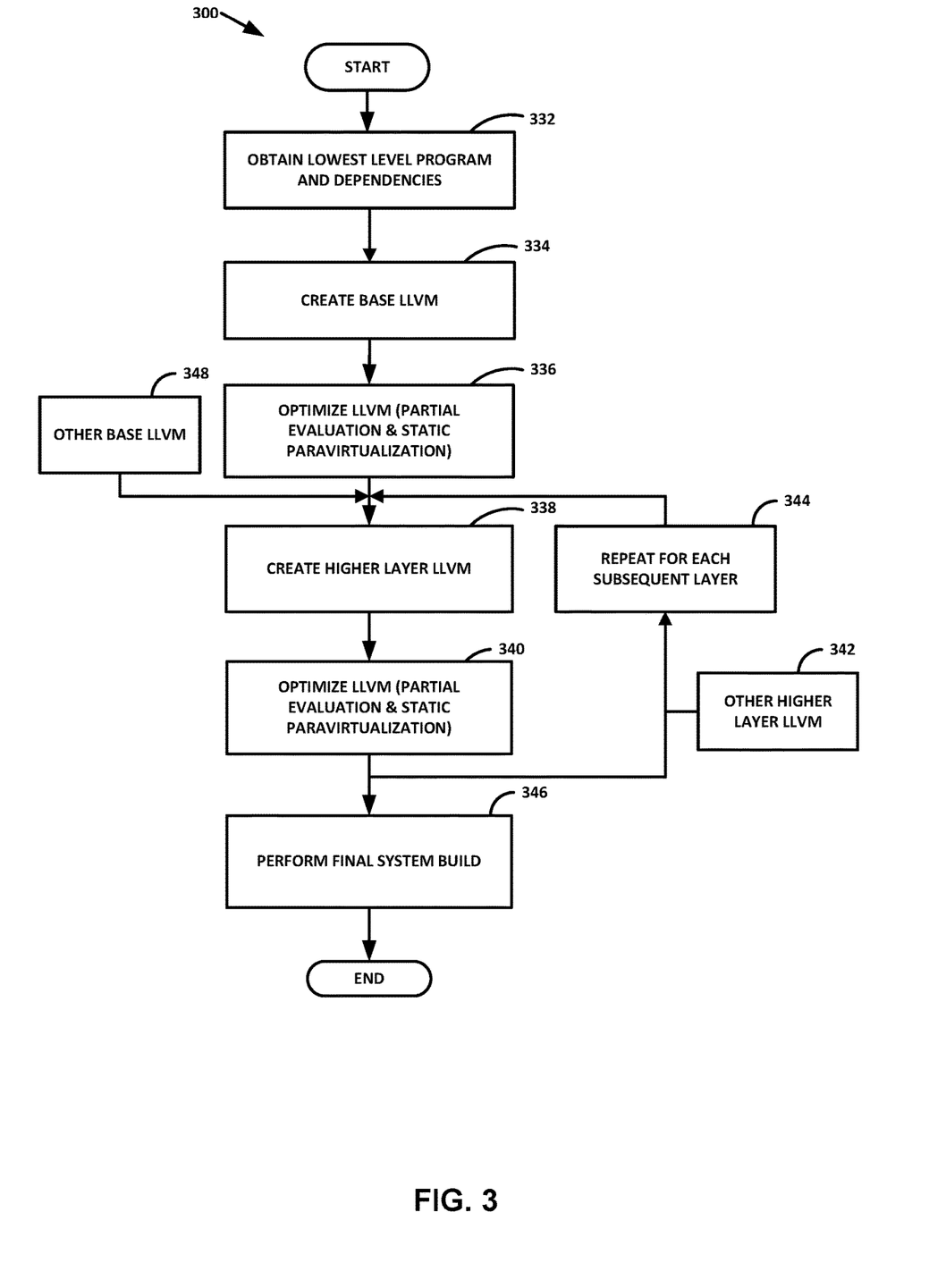
FIG. 3 is a flowchart illustrating an example mode of operation for a computing system to build a unicontainer, according to the techniques described in this disclosure.

Target system 206 is the infrastructure that executes the unicontainers 200. Because a computing system builds unicontainers from the ground up as layers of dependencies, the target system can, in some cases, be a user-definable infrastructure. For example, in some examples, when a user builds a unicontainer they may define the target system 206 to be an operating system, such as Alpine Linux. The built unicontainer would contain only the optimized versions of the dependencies that are not native to Alpine Linux but that are necessary to run the container on Alpine Linux. In other examples, the user can define the target system 206 to be the hardware of target system 206. In that case, the built unicontainer would contain all optimized versions of the dependencies necessary to run the target application directly on the target system 206 hardware. Targeting a unicontainer build to a particular target infrastructure is described further below with respect to FIG. 4. FIG. 3 is a flowchart illustrating an example method of building a unicontainer, according to the techniques described in this disclosure. Although described with respect to computing system 420 of FIG. 4 having a computation engine 422 that executes build module 424, mode of operation 300 may be performed by any computing system, such as those elsewhere described herein.

Figure 4:
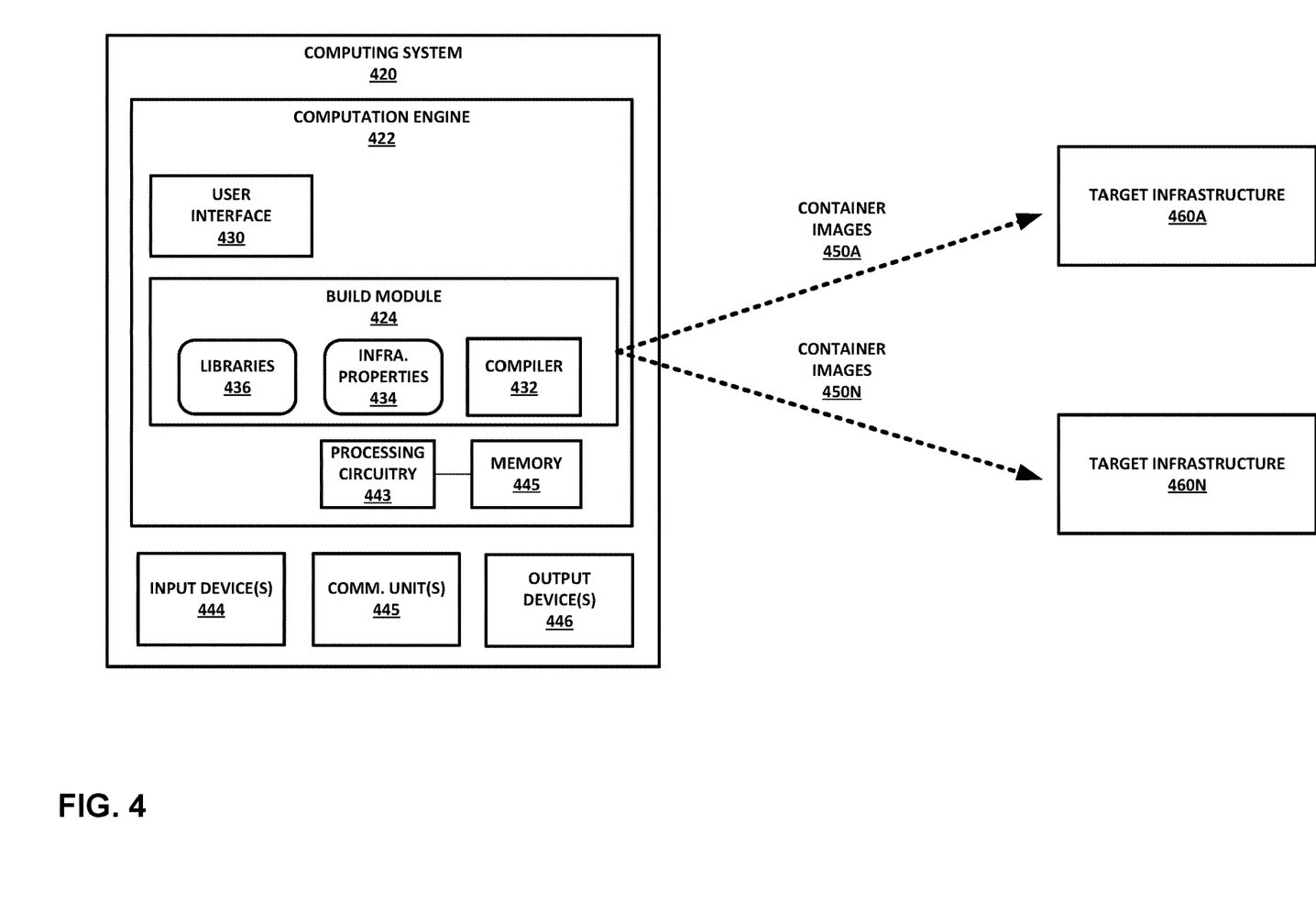
FIG. 4 is block diagram illustrating a system in which a computing system selectively builds and deploys container images for particular target infrastructures, according to the techniques described in this disclosure.

In mode of operation 300, computing system 420 receives, via user interface 430, a build request that includes a recipe for an application and, in some examples, specifies a target infrastructure to which the application is to be deployed. The build request may also include code for the application. In general, a recipe for an application lists information needed to build a package for the application, such as libraries to link along with build flags, applications or other binaries to include, packages, and so forth. The target infrastructure may be specified using an identifier, a list of available modules, applications, libraries, packages, etc., deployed to the architecture for supporting deployed containers, or other data that indicates to computing system 420 dependencies that do not need to be included within a unicontainer build for the application that is defined at least in part by the recipe.

In the example computing system 420 of FIG. 4, infrastructure properties 434 is a data structure that maps an identifier for each of a plurality of target infrastructures to properties of the identified target infrastructure. Based on specified target infrastructure for the requested build, computing system 420 analyzes infrastructure properties 434 for the specified target infrastructure and determines the overall dependency structure necessary to run the target application on the target infrastructure (332). An example dependency structure for an application is illustrated by the nested layers shown in FIG. 2. A dependency graph may be a tree that includes a plurality of levels, each level having one or more nodes, each of the nodes dependent on zero or more nodes of a level below, with leaf nodes of the dependency graph being the lowest-level dependencies and having no dependencies. The root of the dependency graph is the application. Each of the nodes may represent a library, package, application, binary, or other code. Dependent nodes are child dependencies of a parent node.

The target infrastructure in effect defines a floor of available dependencies that do not need to be included in a unicontainer package. Computing system 420 builds or obtains, from dependency registry 436, versions of dependencies for use in satisfying the dependency structure to build a unicontainer that supports the application. For example, compiler 432 may build a language-independent intermediate representation for dependencies in the first layer of the dependency structure (334). The first layer of the dependency structure is the lowest layer of dependencies necessary to run a unicontainer on the target infrastructure. Compiler 432 analyzes the applications that directly rely on first layer dependencies (i.e., second layer) to determine what functions and services in the first layer are necessary for the second layer to operate. Compiler 432 may optimize the first layer dependencies by removing any functions from the first layer that are not necessary for the second layer to operate (336). Compiler 432 may also further optimize the first layer dependencies by performing partial evaluation of any function that is not dependent on an unknown value at the time of compilation. In this way, compiler 432 may build a dependency if the needed version (e.g., a minimal build) of the dependency is not already included in dependency registry 436.

Compiler 432 then builds a language-independent intermediate representation for the second layer of the dependency structure (338). This may be an optional step for a dependency in the layer that can be packaged as a single dependency referenced by a higher-level node in the dependency structure. Another base language-independent intermediate representation 348 may be included in the package. Compiler 432 analyzes the dependency structure from the recipe to determine if there are any nodes that directly rely on the second layer dependencies (i.e., third layer). If there are third layer dependencies, compiler 432 may determine what function and/or services in the second layer are necessary for the third layer node to operate. Compiler 432 may optimize the second layer by removing any function from the second layer that is not necessary for the third layer to operate (340). Compiler 432 may also further optimize the second layer dependencies by performing partial evaluation of any function that is not dependent on an unknown value at the time of compilation. Another higher layer (i.e., intermediate representation 348) language-independent not base language-independent intermediate representation 342 may be included in the package. Compiler 432 repeats 338 and 340 for each subsequent layer until the compiler reaches the target application (344). When the computing system 420 reaches the root of the dependency structure (NO branch of 340), no further dependencies remain to be obtained or optimized. Build module 424 may generate a modified recipe that references each of the optimized dependencies rather than, e.g., the standard package or dependency. Compiler 432 then performs a final system build outputting a single container package that can run the requested application on the target infrastructure (346). As used herein, optimized may refer to a reduced-function dependency or application from the corresponding standard build that is not necessarily the optimal, minimum required functionality for that dependency or application.

An advantage of the unicontainer build system is that the unicontainer is a single statically-linked executable that is a smaller image than the standard build and, in some instance, is the smallest image possible to run the target application. The use of a language-independent intermediate representation or the unicontainer build may also allow for further optimization by partial evaluation, size reduction, and may reduce potential vulnerabilities.

In some examples, optimization of a dependency may be achieved prior to building the language intermediate representation by first analyzing the dependency to be optimized and its sub-dependencies. Compiler 432 then determines what portions of the sub-dependencies that are not necessary for the dependency to function as expected and removes them from the underlying codebase. Compiler 432 may in some cases then build a language-independent intermediate representation that can be further optimized using any of the methods disclosed herein.

In some examples, the system builds unicontainers in a bottom-up fashion by first analyzing the target application to determine the dependency structure. The system creates the first layer of the unicontainer by starting with the base level libraries that are necessary for the application to function as expected (e.g., glibc). The system analyzes the first layer dependencies, that is dependencies that require the base level dependencies to function and removes any functions from the base level dependencies that are not necessary for the first layer dependencies to function as expected. The system then analyzes the second layer dependencies, that is the dependencies that require the first layer dependencies to function and removes any functions from the first layer of dependencies that are not necessary for the second layer to function as expected. The system then builds a language-independent intermediate representation of the first layer and performs further optimization techniques described herein. Once the first layer is built, the system then moves to the second layer. The system analyzes the third layer dependencies, that is the dependencies that require the second layer dependencies to function, or the target application if no third layer dependency exists and removes any functions from the second layer that are not necessary for the third layer dependencies or target application to function as expected. This is repeated for all subsequent layers until all dependency layers have been built and optimized. Once all of the dependencies have been built into a language-independent intermediate representation, the system then builds the final target application as a single statically linked executable. While described with respect to three layers of dependencies above, the techniques are applicable to a single layer of dependencies, e.g., root build and dependencies thereof.

In some examples, the system builds a unicontainer in a top-down fashion by first analyzing the target application determining the top layer dependencies (i.e., direct dependency) of the target application and what functions of the direct dependencies are necessary for the target application to function as expected, removing any functions that are not necessary. The system then analyzes the optimized top layer dependencies and determines what next layer dependencies and corresponding functions are necessary for the optimized top layer dependency to function as expected, removing any functions and/or dependencies that are not necessary. The system repeats this until reaching a pre-defined stop layer or base level dependencies, which may correspond to the dependency necessary to run on the target infrastructure. The system may in some cases then builds a language-independent intermediate representation for each layer of dependencies performing further optimization using techniques described herein. The system then builds the final target application as a single statically linked executable.

The system can also be configured to build unicontainers using pre-optimized dependencies. In some examples, the system starts with a general-purpose dependency. The system analyzes the general-purpose dependency to determine the dependency structure. The system creates the first layer by starting with the base level libraries that are necessary for the general-purpose dependency to function as expected. The system analyzes the first layer dependencies and removes any functions from the base level dependencies that are not necessary for the first layer dependencies to function as expected. The system then analyzes the second layer dependencies and removes any functions from the first layer of dependencies that are not necessary for the second layer to function as expected. The system then builds a language-independent intermediate representation of the first layer and performs further optimization techniques described herein. Once the first layer is built, the system then moves to the second layer. The system analyzes either the third layer dependencies or the general-purpose dependency if no third layer dependency exists and removes any functions from the second layer that is not necessary for the third layer dependencies or target application to function as expected. This is repeated for all subsequent layers until all dependency layers have been built and optimized into a single pre-optimized general-purpose dependency that is a language-independent intermediate representation. The pre-optimized general-purpose dependency can be stored in a repository or on the local machine. When a target application depends on the general-purpose dependency, the system can retrieve and use the pre-optimized general-purpose dependency stored to dependency registry 436.

In some examples, when the target application consists of shell commands, the system builds a single executable that contains only the needed commands and their dependencies (if any). The system can build more complex applications based on those executables (e.g., runtime environments). For example, if a target application runs a number of python scripts and nothing else, the system builds a statically linked python interpreter that is applied to a number of scripts without any other dependencies.

The system can also be configured to build unicontainers from a traditional container recipe file, e.g., a Docker dockerfile. In some examples, the system analyzes the traditional container recipe file and pulls only the dependencies that are necessary for the application to function as expected. The system then can optimize the dependencies using either the bottom-up or top-down methods described above.

Some applications may be distributed among multiple containers. The techniques may be applied with respect to one or more of such containers. For example, computing system 420 may receive a request to build a unicontainer from a recipe file, pull all dependencies indicated by the recipe file, and prune the dependencies of unneeded functions, based in part on the target infrastructure. Computing system 420 may then build the smallest execution element that will run on the target infrastructure.

Generally, when building containers using static linking, this increases the size of the application versus dynamic linking for instance. However, some libraries may be provided by the target infrastructure that provides a floor of available libraries, packages, binaries, or other dependencies for deploying in the cloud. By statically-linking in only the dependencies not provided by the target infrastructure, the techniques may reduce the size of the unicontainer package.

To provide one example, a user may deploy Docker containers for execution on a target infrastructure. Docker uses an operating system, which organizes applications using the notion of package (including, e.g., Node.js, web framework). By installing/building the package to hosts of the target infrastructure, it will build and install all of the dependencies for the package. The techniques may repurpose and modify this build process to perform static linking for all packages and dependencies and, e.g., to use the clang compiler instead of gcc. Because clang generates LLVM intermediate representation usable for doing optimizations, compiling code using clang to the intermediate representation may enable further optimizations.

The above operating system has a description of each package and its dependencies. But the techniques may be applicable to other applications, operating systems, etc. A unicontainer build may be particularly useful for popular packages to tailor them to different infrastructures that may then be selected by a user, or by a computing system 420, to support a new application on a target infrastructure.

In a similar manner, computing system 420 in this way can build reduced-size containers from the ground up, beginning with basic libraries that almost all containers rely on. A user can direct computing system 420 to build a number of applications that use glibc and from which more complex applications can be built. For instance, a user can request computing system 420 to build a tiny web server as well as busybox, the swiss army knife of UNIX utilities. Busybox allows a user to run shell commands and is built using glibc. If an image consists uniquely of running a number of shell commands, computing system 420 build the application as a single executable that contains only the needed commands and their glibc dependencies. Similarly, if an application consists of a number of C files and only requires glibc, then the resulting image is a single executable file with no other dependencies. A user may then request computing system 420 to build more complex applications such as runtime environments.

For example, a container may run a number of python scripts and nothing else. A user may request computing system 420 build a statically-linked python interpreter that is applied to a number of scripts without any other dependencies. The user can then target other popular runtimes such as the GoLang and Node.js to run web applications. To build a container image, docker relies on a Dockerfile, a list of command lines that specify the different layers required to build the image. By analyzing the Dockerfile for an image, computing system 420 can pull only the pieces that the application needs and build a reduced-size unicontainer and, in some case, the smallest possible container image.

Furthermore, in some examples, computing system 420 can partially evaluate the application code using the arguments passed in the Dockerfile. Computing system 420 may then specialize the code to just those arguments. This reduces both the size of the resulting container and may eliminate unnecessary and potentially vulnerable dependencies. As a byproduct of this technique, the LLVM byte code representation of the container image executable is generated and can be analyzed for a number of purposes.

Dependency registry 436 may have, in some examples, different versions of each library/package with different dependency combinations. For instance, there could be a specific version of an operating system, and this version has specified versions of all of the dependency packages. At some point, a set of consistent packages enables all packages continue to evolve, but if there is a conflict, a new snapshot is created with a new version of the operating system. For example, dependency registry 436 may be a container registry. A registry file may list each of the containers in the container registry and include, for each version of the container, a list of functions provided by the version of the container. In this way, computing system 420 may resolve a list of required functions to the right version of the container, in some cases by obtaining the version of the container that only includes the required functions.

FIG. 4 is a block diagram illustrating a system in which a computing system selectively builds and deploys container images for particular target infrastructures, according to the techniques described in this disclosure. Computing system 420 represents one or more computing devices configured for executing a build module 424 and user interface 430. Computing system 420 may represent an example instance of any unicontainer build system described in this disclosure.

Computing system 420 is configured to build software packages in the form of unicontainers. Computing system 420 may explicitly define dependencies, produce build processes that are repeatable and verifiable, and allow for whole program analysis.

Computing system include computation engine 422 to execute build module 424 and user interface 430. Computation engine includes processing circuitry operably coupled to memory 445.

Memory 445 may store information for processing during operation of computation engine 422. In some example, memory 445 may include temporary memories, meaning that a primary purpose of the one or more storage devices is not long-term. Memory 445 may be configured for short-term storage of information as volatile memory and therefore not retain stored contents if deactivated. Examples of volatile memories include random access memories (RAM), dynamic random-access memories (DRAM), static random access memories (SRAM), and other forms of volatile memories known in the art. Memory 445, in some examples, also include one or more computer-readable storage media. Memory 445 may be configured to store larger amounts of information than volatile memory. Memory 445 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 445 may store program instructions and/or data associated with one or more of the modules described in accordance with one or more aspects of this disclosure.

Processing circuitry 443 and memory 445 may provide an operating environment or platform for computation engine 422, which may be implemented as software, but may in some examples include any combination of hardware, firmware, and software. Processing circuitry 443 may execute instructions and memory 445 may store instructions and/or data of one or more modules. The combination of processing circuitry 443 and memory 445 may retrieve, store, and/or execute the instructions and/or data of one or more applications, modules, or software. Processing circuitry 443 and memory 445 may also be operably coupled to one or more other software and/or hardware components, including, but not limited to, one or more of the components illustrated in FIG. 4.

Computation engine 422 may perform operations described using software, hardware, firmware, or a mixture of hardware, software, and firmware residing in and/or executing at computing system 420. Computation engine 422 may execute each of the module(s) with multiple processors or multiple devices. Computation engine 422 may execute one or more of such modules as a virtual machine or container executing on underlying hardware.

One or more of such modules may execute as one or more services of an operating system or computing platform. One or more of such modules may execute as one or more executable programs at an application layer of a computing platform.

One or more input devices 444 of computing system 420 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

User interface 430 is a user interface for computing system 420. User interface 430 may represent a graphical user interface, a command-line interface, one or more application programming interfaces (APIs), or other interface by which a user may interface with computing system 420.

A user (not shown) may generate and send a build request for an application. The build request may be received by user interface 430, such as entered via a graphical user interface, entered into a command-line interface, or generated and send as a communication to invoke one or more methods of a set of APIs.

The build request may include a recipe and, in some examples, identify a selected target infrastructure of target infrastructures 460A-460N. The recipe may include instructions in the form of, e.g., a make file, dependency list, optimization parameters, or any other information that defines the dependencies, organization, build process, and so forth for building the target application. Build module 424 can use the recipe and target application to build a unicontainer that implements the application, as described in this disclosure.

The build module 424 may use infrastructure properties 434 to determine the dependencies and/or functions thereof are necessary for the target application to run on the selected target infrastructure. The infrastructure properties may include information about different the different target infrastructures 460A-460N that a unicontainer may be deployed on. Such infrastructure properties may include libraries, binaries, operating systems, applications, or other possible dependencies of the requested application. Different target infrastructures 460 can have different properties. The build module 424 may use dependencies stored to dependency registry 436 to build the unicontainer. Dependency registry 436 may be stored to a separate storage device. Dependencies may be pre-optimized using any one of the methods described herein in order to speed up the build process.

The compiler 432 may include any compiler, preferably one that generates an intermediate representation that may be optimized. For example, the C/C++ compiler clang which is capable of generating a language independent LLVM intermediate representation. The compiler may include various wrappers, such as the gllvm wrapper for clang. Build module 424 may perform static linking of an application and dependencies.

When building, build module 424 may use static linking for the binaries and libraries. An advantage of using static linking is that dynamic linking may be inconsistent with application deployments on the modern software stack. For example, cloud computing and microservices require deployments that are small, fast, and specialized, which is contrary to dynamic linking. Dynamic linking is more suitable for general-purpose desktops where sharing of resources is desired. However, conventional static linking tends to produce code that is bloated and heavy which is not desired for cloud or IoT devices. The techniques of this disclosure may provide a best-of-both worlds approach of contained, statically-linked binaries with reduced-size footprints.

Build module 424 may utilize a recipe file which provides the steps that need to be performed at build time. In some embodiments, the recipe file may be a YAML-formatted file that contains the link to download the source code for the target application, the name of other pre-optimized packages that are build dependencies, the invocations that need to be run in order to build the package, and, for some packages, the path to additional resource files, such as patches, that will be used during the build stage. The recipe file may be simple and small allowing for easy interpretation and modification. The recipe file may be a Dockerfile.

In some embodiments, the build module 424 may also use a contents file that provides verification of the built modules. The contents file may be a YAML formatted file that splits the package into different sub-packages, each of which is described by the list of files that compose the sub-package, and the checksum that is used to check the integrity of the build and to refine dependency management Build module 424 may create the recipe file by first receiving a traditional build file and a target infrastructure. The traditional build file may be any typical build file such as a make file or a Dockerfile. To create the recipe file, build module 424 analyzes the traditional build file and target infrastructure and includes in the recipe file only those dependencies that are necessary for the target program to run on the infrastructure.

For example, if the selected target infrastructure 460 is a thin operating system which includes only minimum utilities, the build module 424 may add to the recipe file the basic libraries that almost all applications rely on (e.g., glibc). The build module 424 then adds the next layer of dependencies to the recipe file. The build module 424 continues this until reaching the final layer. As another example, if an application consists uniquely of running a number of shell commands, the build module adds to the recipe file only the necessary commands and their basic library dependencies. In another example, if the selected target infrastructure 460 is a more robust operating system and the target application runs a number of python scripts and nothing else, the build module 424 adds to the recipe a statically linked python interpreter and no other dependencies.

In some embodiments, build module 424 may convert the recipe file to a traditional build file that includes the optimizations and additional dependencies prescribed by the recipe file. In some embodiments, the build module 424 may convert the recipe file into a Dockerfile. The build module 424 determines the commands for generating the Dockerfile providing control of what is linked into the Docker image when building the package. The system is then able to trace the provenance of every single build product. Additionally, the build module 424 may account for every single file that is present in a released sub-package, and then in a container that runs in production.

One advantage of this traceability is that it allows for the ability to monitor every build step for file accesses. In addition, instead of relying on dynamically linked libraries at run time, the system controls what goes into the traditional build file allowing traceability of the builds and ability to account for every file.

Another advantage is that the unicontainer is amenable to whole program analysis. When applying formal verification to source code, what is verified is not what is executed. Because an application can be compiled with different compilers and may be deployed with different versions of libraries, it is not possible to guarantee that source code verification translates into correct execution.

The systematic production of a language-independent, intermediate representation bitcode allows for formal verification of all application code and the libraries it is dependent on. As an example, SeaHorn, a fully automated analysis framework for LLVM-based languages, can be used to perform a number of program analyses, such as abstract interpretation, invariant generation, memory safety, and bounded model-checking. Because of the reproducibility of builds a formally analyzed applications is proved to exhibit the same behavior on different platforms.

Further, the verification at the language-independent intermediate representation bitcode level can be done after code specialization using partial evaluation and code winnowing techniques. These techniques may be taken one step further so that I/O operations are specialized and all read and writes to files are replaced with in-memory loads and stores. This often improves performances by avoiding the execution of expensive system calls. Of note is that it also ensures that what is being verified is close to what is being executed.

In some embodiments, the compiler 432 builds a unicontainer by first accessing the target infrastructure and populating it with a base image that contains the elements common to all the builds, such as a compiler, a linker, and an environment. The compiler 432 then copies the dependencies to the infrastructure and downloads the source code for the target application. Finally, the compiler 432 executes the build commands of the recipe file.

In some embodiments, after all the sub-packages have been released, the system verifies that the checksums of these images are consistent with the ones provided in the contents file. This ensures the integrity of the build, while at the same time serving as a proof of reproducibility. Initially, the checksum is written to the contents file when the sub-package is first created. Fine-grained sub-packaging also enables fine-grained dependency management.

In some embodiments, the build environment is used as a disposable container. The environment is launched and populated with the base build environment and the build dependencies. When building and release of the package have completed successfully, the container may be removed and never reused. An advantage of this approach is that each build may be performed in a fresh and isolated environment.

When building the unicontainer is complete, the build module 424 may output a unicontainer either directly onto memory 445, through an output device 446, or through a communication unit 448. The build module 424 may also output the language-independent intermediate representation either directly onto memory 445, through an output device 446, or through a communication unit 448 for later retrieval and use as a pre-optimized dependency.

In some examples, the build environment is kept as minimal as possible and performed in a disposable environment. For example, build module 424 may be run on top of an Alpine Linux Docker image, which contains only the tools necessary for the build. This has the advantage that only the necessary runtime is present for the working build, and there are no extraneous files included. Once the build environment is launched it is populated with the base environment and build dependencies. When building and release of the unicontainer is completed, in such examples, the Alpine Linux Docker image is killed and never reused. This ensures that every build is performed with a new isolated environment.

One or more output devices 446 of computing system 420 may generate, transmit, or process output. Examples of output are tactile, audio, visual, and/or video output. Output devices 446 may include a display, sound card, video graphics adapter card, speaker, presence-sensitive screen, one or more USB interfaces, video and/or audio output interfaces, or any other type of device capable of generating tactile, audio, video, or other output. Output devices 446 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 420 may include a presence-sensitive display that may serve as a user interface device that operates both as one or more input devices 444 and one or more output devices 446.

One or more communication units 448 of computing system 420 may communicate with devices external to computing system 420 (or among separate computing devices of computing system 340) by transmitting and/or receiving data and may operate, in some respects, as both an input device and an output device. In some examples, communication units 448 may communicate with other devices over a network. In other examples, communication units 448 may send and/or receive radio signals on a radio network such as a cellular radio network. Examples of communication units 448 include a network interface card (e.g. such as an Ethernet card), an optical transceiver, a radio frequency transceiver, a GPS receiver, or any other type of device that can send and/or receive information. Other examples of communication units 445 may include Bluetooth®, GPS, 3G, 4G, and Wi-Fi® radios found in mobile devices as well as Universal Serial Bus (USB) controllers and the like.

The advantage of unicontainers is that they are able to use the same target application and build environment to target different infrastructures. This streamlines the deployment of software to various platforms such as in the cloud, on bare metal servers, or in a Docker environment. For example, target infrastructure 460A through 460N may represent various infrastructures with different properties such as bare-metal servers, virtual machines, and containers. The properties of these infrastructures will inform the build module 424 on how to build the unicontainer so that it may be deployed on the target infrastructure. That information may be contained in the infrastructure properties 434. The build module may be informed of the target infrastructure 460A through 460N by either input through user interface 430, input device 444, or through communication with the target infrastructure 460A through 460N using one of the communication units 448. Once the build module 424 builds the unicontainer, the computing system 420 may deploy the unicontainer as one of container images 450A-450N to the selected target infrastructures 460 using either one of the output devices 446 or one of the communication units 448. Alternatively, the computing system 420 may store the unicontainer directly to memory 445. As illustrated and described herein, a container image 450A built to execute on target infrastructure 460A may be different than a container image 450N built to execute on target infrastructure 460N, for each of target infrastructures 460A-460N may have different infrastructure.

Computing system 420 may store multiple unicontainers builds to a registry of applications, which users may select based on their target infrastructure requirements. Computing system 420 may offer a service to not only build unicontainers, but to send, deploy, and/or orchestrate unicontainers to target infrastructures or to a user computer. A user, via user interface 430, may request a particular unicontainer built and stored by computing system 420. In response, computing system 420 may output the container to the user or output the unicontainer to the selected target infrastructure 460.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system for generating container images, the computing system comprising:
   a build module; and
   a computation engine comprising at least one processor and configured to execute the build module to:
   receive a recipe file for an application build of an application to be deployed as a container image and an indication of a target infrastructure of a plurality of target infrastructures, wherein the recipe file specifies one or more dependencies of the application,
   obtain, based at least on required functions of a first dependency of the one or more dependencies to support the application that are not provided by the target infrastructure, a first version of the first dependency that is configured to provide the required functions but that is not configured to provide at least one other function provided by the target infrastructure, and
   build a container image comprising the application, wherein to build the container image the build module is configured to statically link the first version of the first dependency into the application to optimize the application build of the application.

2. The computing system of claim 1, wherein the first version of the first dependency comprises a different container image.

3. The computing system of claim 1, further comprising:
   a registry file that maps lists of required functions for a dependency to respective versions of the dependency that include the required functions for the dependency,
   wherein the build module is configured to identify, based on the recipe file, the required functions of the first dependency,
   wherein to obtain the first version of the first dependency, the build module is configured to map, using the registry file, the required functions to the first version of the first dependency.

4. The computing system of claim 1,
   wherein the build module is configured to process the recipe file to generate a dependency structure that includes a plurality of layers, each of the layers comprising at least one of the dependencies.

5. The computing system of claim 4, wherein each of the layers comprises an application package.

6. The computing system of claim 1,
   wherein each of the one or more dependencies are applications that each provides a produce a desired functionality,
   wherein the build module is configured to identify one or more required functions in a dependency of one of the applications that is necessary for the one of the applications to provide the desired functionality,
   wherein the build module is configured to remove at least one function, from at least one of the child dependencies, that are not the one or more required functionalities in order to generate modified child dependencies for the at least one of the child dependencies,
   wherein to build the container image, the build module is configured to statically link the applications into the application, the applications including the modified child dependencies.

7. The computing system of claim 1,
   wherein the computation engine is configured to execute a user interface,
   wherein the user interface is configured to receive a build request comprising the recipe file and the indication of the target infrastructure,
   wherein the build module is configured to determine that the target infrastructure provides a second dependency of the one or more dependencies,
   wherein to build the container image, the build module is configured to build the container image without statically linking the second dependency into the application.

8. The computing system of claim 7, further comprising:
   a data structure that maps a different identifier for each target infrastructure of the plurality of target infrastructures to corresponding properties of the corresponding target infrastructure,
   wherein the build module is configured to determine, based on the indication of the target infrastructure, the target infrastructure provides the second dependency.

9. The computing system of claim 8, wherein each of the plurality of target infrastructures provides a different set of dependencies available to deployed containers.

10. The computing system of claim 7, wherein the second dependency comprises one of a library or an application package.

11. A computing system for generating container images, the computing system comprising:
- a registry;
- a registry file for the registry;
- a build module; and
- a computation engine comprising at least one processor and configured to execute the build module to:
  - receive a recipe file for an application build of an application to be deployed as a container image, wherein the recipe file specifies one or more dependencies of the application,
  - obtain, based at least on required functions of a first dependency of the one or more dependencies to support the application, a first version of the first dependency that is configured to provide the required functions but that is not configured to provide at least one other function provided by a second version of the first dependency,
  - build a container image comprising the application, wherein to build the container image the build module is configured to statically link the first version of the first dependency into the application to optimize the application build of the application,
  - store the container image to the registry, and
  - modify the registry file for the registry to indicate the container image includes the first version of the first dependency, wherein the registry file is used to resolve conflicts associated with different versions of the one or more dependencies of the application.

12. A method for generating container images, comprising:
- receiving, with a computing system, a recipe file for an application build of an application to be deployed as a container image, wherein the recipe file specifies one or more dependencies of the application;
- obtaining, with the computing system, based at least on required functions of a first dependency of the one or more dependencies to support the application, a first version of the first dependency that is configured to provide the required function but that is not configured to provide at least one other function provided by a second version of the first dependency;
- building, with the computing system, a container image comprising the application, wherein to build the container image the computing system is configured to statically link the first version of the first dependency into the application to optimize the application build of the application;
- storing the container image to a registry; and
- modifying a registry file for the registry to indicate the container image includes the first version of the first dependency, wherein the registry file is used to resolve conflicts associated with different versions of the one or more dependencies of the application.

13. A method for generating container images, comprising:
- receiving, with a computing system, a recipe file for an application build of an application to be deployed as a container image and an indication of a target infrastructure of a plurality of target infrastructures, wherein the recipe file specifies one or more dependencies of the application;
- obtaining, with the computing system, based at least on required functions of a first dependency of the one or more dependencies to support the application that are not provided by the target infrastructure, a first version of the first dependency that is configured to provide the required function but that is not configured to provide at least one other function provided by the target infrastructure; and
- building, with the computing system, a container image comprising the application, wherein to build the container image the computing system is configured to statically link the first version of the first dependency into the application to optimize the application build of the application.

14. The method of claim 13, wherein the first version of the first dependency comprises a different container image.

15. The method of claim 13,
wherein a registry file maps lists of required functions for a dependency to respective versions of the dependency that include the required functions for the dependency, the method further comprising:
- identifying, based on the recipe file, the required functions of the first dependency,
- wherein obtaining the first version of the first dependency comprises mapping, using the dependency registry file, the required functions to the first version of the first dependency.

16. The method of claim 13, further comprising:
processing, with the computing system, the recipe file to generate a dependency structure that includes a plurality of layers, each of the layers comprising at least one of the dependencies.

17. The method of claim 13, wherein each of the layers comprises an application package.

18. The method of claim 13,
wherein a data structure maps a different identifier for each target infrastructure of the plurality of target infrastructures to corresponding properties of the corresponding target infrastructure, the method further comprising:
- receiving, with the computing system, a build request comprising the recipe file and the indication of the target infrastructure;
- determining, with the computing system, using the data structure, that the target infrastructure provides a second dependency of the one or more dependencies,
- wherein building the container image comprises building the container image without statically linking the second dependency into the application.

19. A non-transitory computer-readable storage medium comprising instructions for causing a computing system to perform operations comprising:
- receiving a recipe file for an application build of an application to be deployed as a container image and an indication of a target infrastructure of a plurality of target infrastructures, wherein the recipe file specifies one or more dependencies of the application;
- obtaining, based at least on required functions of a first dependency of the one or more dependencies to support the application that are not provided by the target infrastructure, a first version of the first dependency that is configured to provide the required function but that is not configured to provide at least one other function provided by the target infrastructure; and building a container image comprising the application, wherein to build the container image the computing system is configured to statically link the first version of the first dependency into the application to optimize the application build of the application.

20. A non-transitory computer-readable storage medium comprising instructions for causing a computing system to perform operations comprising:

receiving a recipe file for an application build of an application to be deployed as a container image, wherein the recipe file specifies one or more dependencies of the application;

obtaining, based at least on required functions of a first dependency of the one or more dependencies to support the application, a first version of the first dependency that is configured to provide the required function but that is not configured to provide at least one other function provided by a second version of the first dependency;

building a container image comprising the application, wherein to build the container image the computing system is configured to statically link the first version of the first dependency into the application to optimize the application build of the application;

storing the container image to a registry; and modifying a registry file for the registry to indicate the container image includes the first version of the first dependency, wherein the registry file is used to resolve conflicts associated with different versions of the one or more dependencies of the application.

* * * * *